April 11, 1961

H. H. KOLBE 2,979,344

EXPULSION BAG FITTING

Filed Feb. 13, 1958

INVENTOR.
HENRY H. KOLBE
BY W. A. Fraser
ATTY.

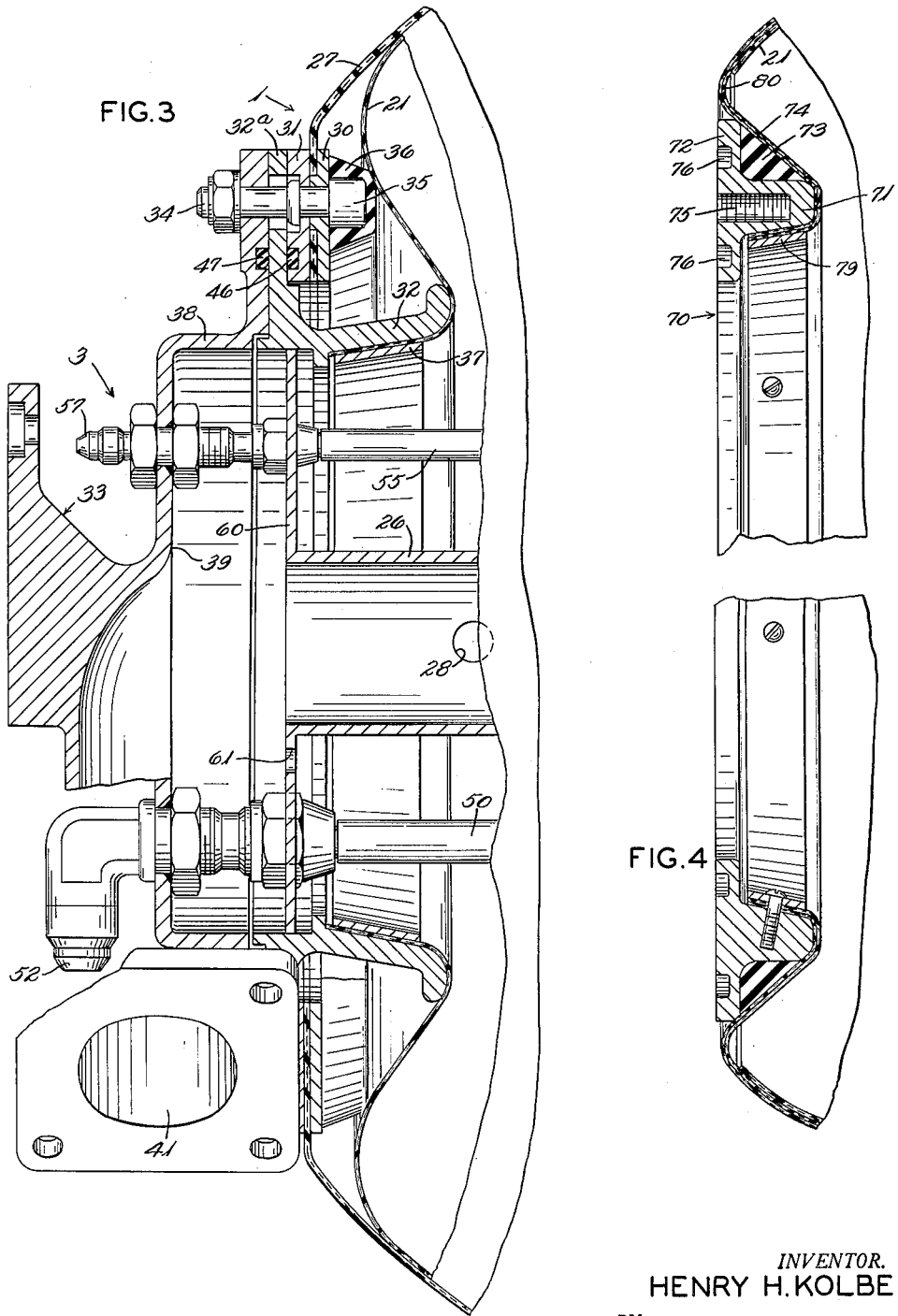

United States Patent Office

2,979,344
Patented Apr. 11, 1961

2,979,344

EXPULSION BAG FITTING

Henry H. Kolbe, Los Angeles, Calif., assignor to The Firestone Tire & Rubber Company, Akron, Ohio, a corporation of Ohio Filed Feb. 13, 1958, Ser. No. 715,082

2 Claims. (Cl. 285—200)

This invention relates to fittings for securing flexible containers to supporting structures with which they cooperate.

For example, in the fuel system for modern high speed vehicles, it is important that fuel be maintained in a uniformly constant flow from the fuel tank to the engine. When such a vehicle makes a sudden change of direction the force of inertia may cause the fuel in the fuel system to slow or stop circulation. This, of course, is dangerous and has been remedied in part by the use of fuel pumps to maintain constant flow. However, because of the high speeds attained by some present-day vehicles, the force against the fuel in the system is greater than can be overcome by a fuel pump working to maintain a constant pressure head. It has, therefore, become necessary to provide means for maintaining a constant flow of fuel through such a fuel system. To solve this problem a flexible fuel containing inner bag is collapsed by fluid pressure in a flexible outer bag to force fuel into the system. The inner bag contains the fuel which must be forced through a passage common to the inner and outer bag into the fuel system. Repeated collapse and expansion of the inner bag causes unusual and damaging strain on the metal fittings defining the passage and it is to the solution of the problem of early fitting and bag failure that the present invention is directed.

The present invention provides a fitting attached to the marginal edges of aligned holes in both the inner and outer bags and designed to apply the least possible strain to the bag structure.

It is an object of this invention to provide a fitting for securing the marginal hole-defining edges of a fabric container to supporting structure.

It is also an object of the invention to provide means for connecting a hole in an inner bag to a hole in a bag by which it is enveloped; to provide a fitting which is attached to the marginal edge of the hole in an outer bag and adhered to the marginal edge of a hole in an inner bag; to provide a substantially hollow fitting adapted to protrude through a hole in a first bag and inwardly receive the marginal edges defining a hole in a second bag enveloped by the first bag.

These and other objects of the invention will be more fully understood with reference to the specification, claims and drawings of which:

Figure 3 is an enlarged fragmentary sectional view of the fitting of the invention.

Figure 4 is a sectional view of a modification of the invention.

Figure 1:
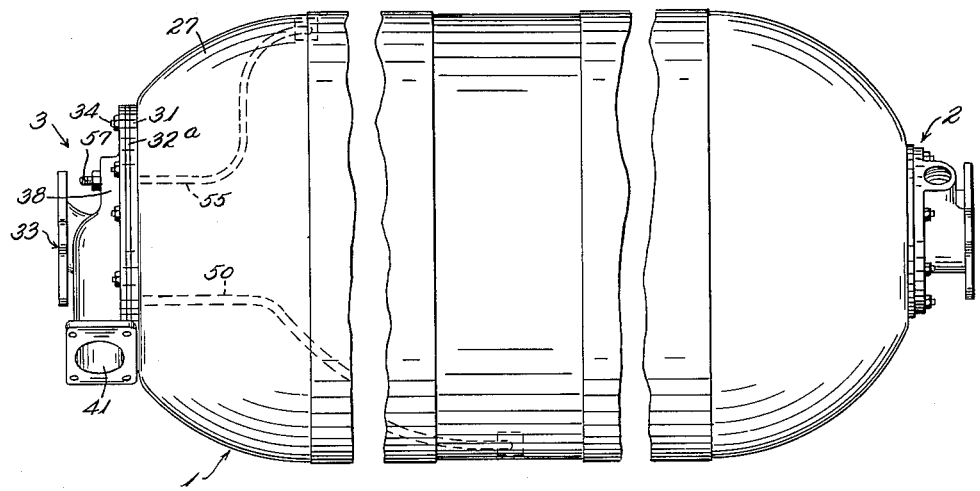
Figure 1 is a side elevation of an expulsion bag assembly embodying the invention.
Figure 2:
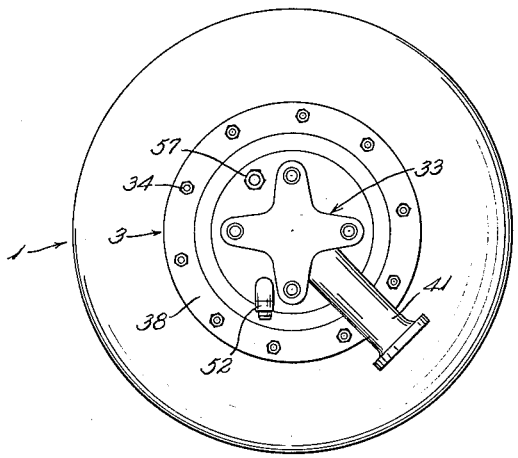
Figure 2 is a left end view of Fig. 1.

Referring to Figure 1, an expulsion tank assembly, generally indicated at 1, is comprised of a fluid receiving body portion terminating at one end in an air inlet assembly, generally indicated at 2, and at the other end in fuel discharge assembly, generally indicated at 3. The air inlet assembly 2, not part of the present invention, is an organization of fittings designed to connect the expulsion tank assembly 1 either to a pressure chamber or to a compressor not shown so that air or other fluid under pressure may be forced into the tank assembly to collapse an inner bag in a manner to be described. The fuel discharge assembly 3, is an organization of fittings, of which the fitting of the present invention is a part, adapted to connect the tank assembly 1 to a fuel system such as found in modern high speed vehicles.

Referring to Fig. 3 a flexible open-end inner bag 21 is enveloped by but not adhered to a flexible open-end outer bag 27. The fuel discharge assembly, generally indicated at 3, is comprised of a pair of bag retaining rings 30 and 31, an inner frustro conical bag mounting member 32, and a fuel discharge manifold assembly (not part of the invention) generally indicated at 33. The edges of the end of outer bag 27 are clamped between rings 30 and 31 which in turn are clamped to a radially extending flange on a flange 32a by bolts 34, having heads 35 covered with rubber ring 36. Bolt 34 also clamps inner bag mounting ring 32 to the fuel discharge manifold assembly 33. Fuel tube 26 terminates at its discharge end in flange 60 which is provided with auxiliary openings 61. The marginal edges of the open end of inner bag 21 are clamped between member 32 and back-up ring 37. In the preferred form of the invention, the edges of the bag 21 are rubberized and are vulcanized to the surfaces of rings 32 and 37 to assure a firm, strong fuel-proof joint.

The walls of inner bag 21 are preferably of rubberized fabric such as nylon fabric calendered with a rubbery copolymer of butadiene and acrylonitrile. The rubberized fabric is formed and vulcanized into the shape of a bag. Adhesion between metal and rubbery butadiene-acrylonitrile polymers (known as nitrile rubber) is obtained conventionally by degreasing the metal surfaces, treating it with an adhesive such as Ty-Ply BN (sold by R. T. Vanderbilt Company) or Loxite 3000 (sold by the Xylos Rubber Company) and vulcanizing the rubbery polymer to the metal with heat and pressure.

Referring to Fig. 3 the marginal edges of the fabric bag 21 may be vulcanized to the member 32, the collar 37 or to both. The marginal edges of the fabric bag 27 may be vulcanized to the flange 31, to the ring 30 or to both.

To seal the fuel discharge assembly against escape of fluids between the various parts, O-rings 46 and 47 are mounted between ring 31 and flange 32a, and between flange 32a and casting 38 respectively.

To provide for drainage of water and fuel and to allow escape of vapor from the tank under certain conditions, drain and vent lines 50 and 55 respectively are mounted in the inner bag and terminate in orifice nozzles 52 and 57 respectively.

In operation, the expulsion tank assembly generally indicated at 1 is connected at the fuel discharge end 3 to a fuel system, not shown through which fuel normally circulates to supply an engine. The air inlet assembly 2 of the device is connected to a source of high pressure air, so that when necessary air is forced into the assembly along a path defined by suitable orifices and into the space between the inner and outer bags so that almost instantaneously at a pressure of about 10 p.s.i.g. the inner bag collapses. Thus fuel in the inner bag is forced through orifices 28 of fuel tube 26, or around the outside of tube 26 through opening 61 in plate 60, through chamber 39, and out pipe 41 under pressure into the fuel system of the vehicle.

Because the inner bag may be collapsed and expanded many times in operation of the vehicle the portion of the inner bag clamped by member 32 and collar 37 is subjected to severe flexing. Because of the rounded configuration of the inner peripheral edge of the member 32 and because the margins of the bag defining the outlet hole are mounted axially instead of radially with respect to frustro conical member 32 stresses on the inner bag to a minimum and service life of the expulsion tank is extended.

Although for purposes of clarity and understanding the tank assembly has been described, the invention resides in the cooperation of frustro conical member 32 with collar 37 and with the flange 32a cooperating with ring 30 as well as with the bag hole edges. In a modification of the invention ring 31 may be eliminated by merging it with flange 32a.

Referring to Fig. 4 in a modification of the invention a fitting is provided for attaching the marginal hole-defining edges of the flexible inner bag 21 to supporting structure. An annular member generally indicated at 70 has an axially extending flange 71 and a radially extending flange 72. The space between the radially outer and axially extending surfaces of the flanges 71 and 72 respectively is filled by rubber ring 73 bonded to ring 70 but not bonded to bag 21 and having an outer surface 74 extending between the outer peripheral edges of flanges 71 and 72. Member 70 may be drilled and tapped as at 75 to provide means for securing the member to supporting structure while annular channels such as 76 provides seats for gaskets or the like to make the connection between member 70 and the supporting structure for the outer bag (not shown) fluid tight. In manufacture the fitting is made with a rubberized fabric flange 80 coupled between collar 79 and flange 71. The flange 80 may be adhered to bag 21 after the fitting is assembled or the flange 80 may be eliminated and the edges of the bag may be brought between collar 79 and flange 71.

Although one organization of structure has been shown by way of example of a preferred form of the invention, those skilled in the art will recognize that other combinations will achieve the desired results within the scope of the following claims.

What is claimed is:

1. A fitting for anchoring cooperating structure to the marginal edges defining an opening in a flexible container, comprising an annular member having axially and radially extending flanges, a rubber ring having surfaces abutting the axially inner and radially outer sides of each said flange respectively and having a surface extending therebetween, a conical surface on the radial inner face of said axial flange, an annular collar having a radially outer frustro conical surface coaxial with and seated within said axial flange and the marginal edges of the bag defining the opening clamped between said conical surfaces and bonded to the continuous surface of said rubber ring.

2. A fitting for anchoring cooperating structure to the marginal edges defining an opening in a flexible container, comprising an annular member having axially and radially extending flanges, a rubber ring having surfaces abutting the axially inner and radially outer sides of each said flange respectively and having a surface extending therebetween, a conical surface on the radial inner face of said axial flange, an annular collar having a radially outer frustro conical surface coaxial with and seated within said axial flange, and the marginal edges of the bag defining the opening clamped between and bonded to said conical surfaces and bonded to the continuous surface of said rubber ring.

References Cited in the file of this patent

UNITED STATES PATENTS

| | | |
|---|---|---|
| 1,504,363 | Madigan | Aug. 12, 1924 |
| 2,344,056 | Papersack | Mar. 14, 1944 |
| 2,441,009 | Cunningham | May 4, 1948 |
| 2,809,056 | Kaiser | Oct. 8, 1957 |
| 2,867,242 | Harris | Jan. 6, 1959 |